United States Patent
Hoerner

(10) Patent No.: US 6,334,384 B1
(45) Date of Patent: Jan. 1, 2002

(54) BRAKE BOOSTER

(75) Inventor: Michel Hoerner, Creteil (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/573,799

(22) Filed: May 18, 2000

(51) Int. Cl.$^7$ ................................................. F15B 9/00
(52) U.S. Cl. ....................................................... 91/369.2
(58) Field of Search ............................... 91/369.2, 369.3

(56) References Cited

U.S. PATENT DOCUMENTS 5,699,713 A   12/1997   Mortimer

FOREIGN PATENT DOCUMENTS

GB   1071739   6/1967

Primary Examiner—Edward K. Look
Assistant Examiner—Michael Leslie
(74) Attorney, Agent, or Firm—Robert M. Sigler

(57) ABSTRACT

A brake booster comprises a housing; a diaphragm sealingly mounted inside the housing to define separate chambers inside the housing; a piston having a longitudinal axis (A), the piston being secured to the diaphragm, extending out of the housing, and being movable along the axis relative to the housing; a reaction member mounted in the piston; an input member extending into the piston and engageable with one side of the reaction member; a disc engageable with the other side of the reaction member; a Belleville spring mounted on the disc; an annular member positioned radially outwards of the disc and engageable with the other side of the reaction member; an output member engaging the Belleville spring, the Belleville spring biasing the output member away from the reaction disc in the rest position of the booster such that only the disc acts on the output member below a predetermined input force ($F_1$) on the input member, and such that at or above the predetermined input force the bias of the Belleville spring is overcome and both the disc and the annular member act on the output member. Provides a ratio change for the booster in a simple manner.

16 Claims, 2 Drawing Sheets

Fig.2.A

BRAKE BOOSTER

TECHNICAL FIELD

The present invention relates to a brake booster for the braking system of a motor vehicle.

BACKGROUND OF THE INVENTION

Known brake boosters generally comprise a housing, a diaphragm sealingly secured in the housing to define a front chamber and a rear chamber, a movable piston attached to the diaphragm, an input member connectable to the brake pedal, and an output member connectable to a piston of a master cylinder. A deformable reaction disc is positioned between the output member and the piston. When the booster is operated, the reaction disc receives the output force and deforms such as to tend to push back on the input member.

SUMMARY OF THE INVENTION

The object of the present invention is to provide an improvement in the performance of such a brake booster.

A brake booster in accordance with the present invention comprises a housing; a diaphragm sealingly mounted inside the housing to define separate chambers inside the housing; a piston having a longitudinal axis, the piston being secured to the diaphragm, extending out of the housing, and being movable along the axis relative to the housing; a reaction member mounted in the piston; an input member extending into the piston and engageable with one side of the reaction member; a disc engageable with the other side of the reaction member; a Belleville spring mounted on the disc; an annular member positioned radially outwards of the disc and engageable with the other side of the reaction member; an output member engaging the Belleville spring, the Belleville spring biasing the output member away from the reaction disc in the rest position of the booster such that only the disc acts on the output member below a predetermined input force on the input member, and such that at or above the predetermined input force the bias of the Belleville spring is overcome and both the disc and the annular member act on the output member.

The present invention provides a brake booster in which the ratio of the booster changes at a predetermined input force, when the Belleville spring load is overcome to increase the effective contact area between the output member and the reaction member. This design provides increased brake pressure, for example, during panic braking, with a simple and easy arrangement.

BRIEF DESCRIPTION OF THE DRAWINGS

The present invention will now be described, by way of example, with reference to the accompanying drawings, in which:

FIG. 2a is an enlarged partial view of an alternative embodiment to the brake booster of FIGS. 1 and 2, in which the annular member is integrally formed with the output member.

DESCRIPTION OF THE PREFERRED EMBODIMENT

Figure 1:
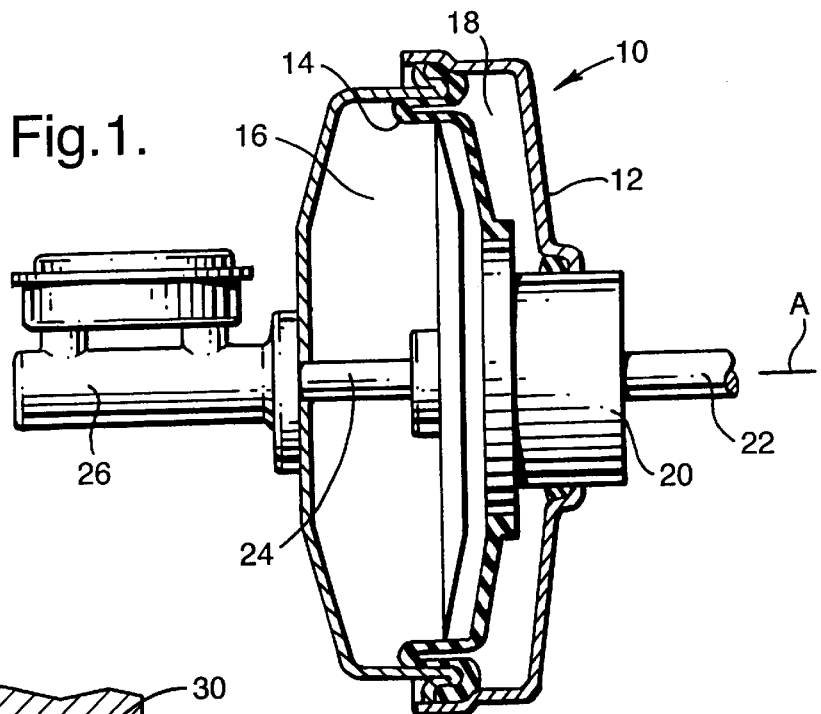
FIG. 1 is a schematic cross-sectional view of a brake booster in accordance with the present invention.
Figure 2:
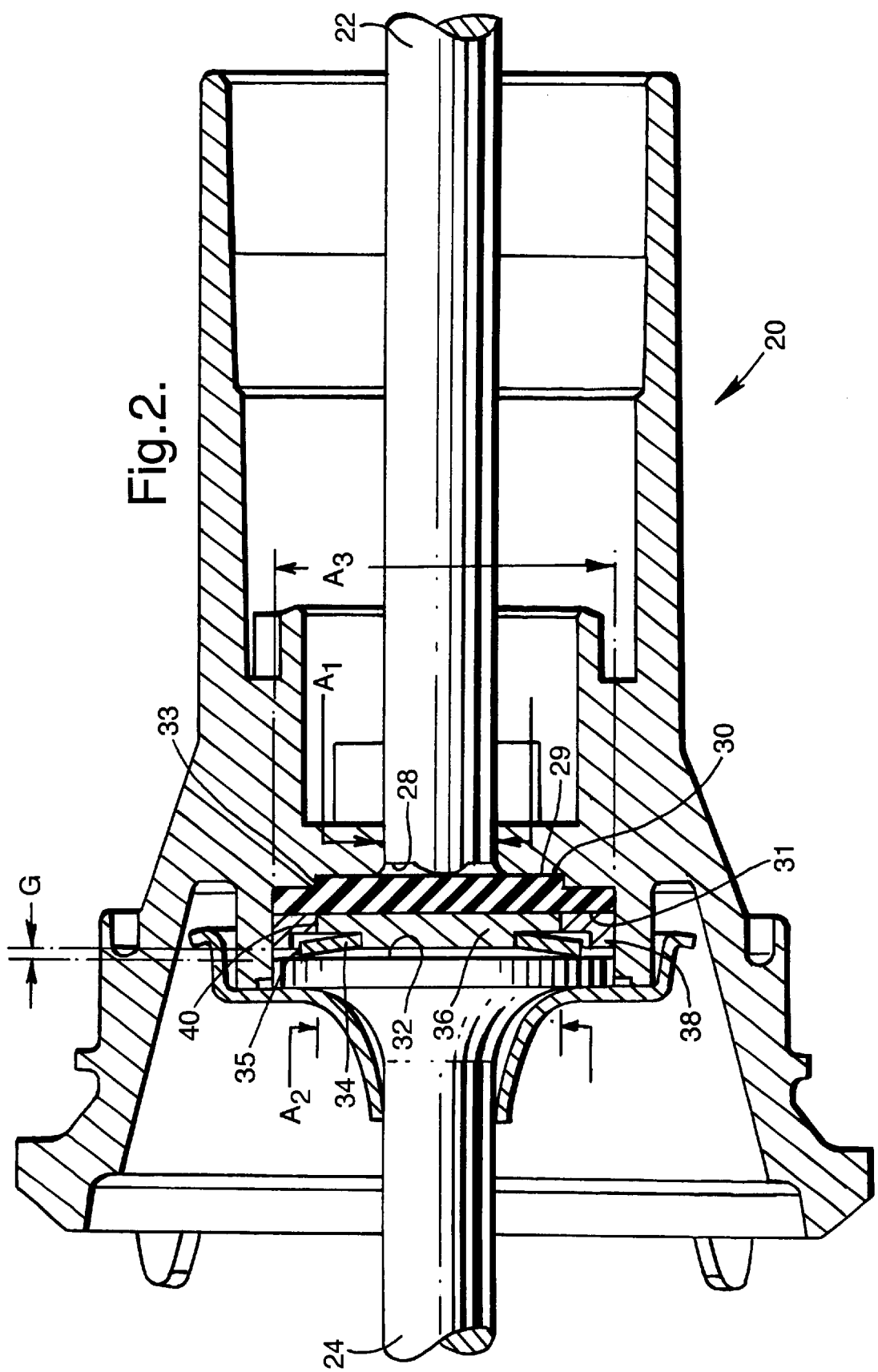
FIG. 2 is a cross-sectional view of part of the brake booster of FIG. 1.

Referring to FIGS. 1 and 2, the brake booster 10 in accordance with the present invention comprises a housing 12, and a diaphragm 14 sealingly secured inside the housing to define a front chamber 16 and a rear chamber 18. A piston 20 is attached to the diaphragm 14 and extends out of the rear of the housing 12. The piston 20 has a longitudinal axis A and can reciprocate in the direction of the axis relative to the housing 12. An input member or rod 22 extends into the piston 20 from the rear. The rod 22 is connectable to a brake pedal (not shown). An output member or rod 24 extends out through the front of the housing 12 and is connectable to a piston in a master cylinder 26. The input member 22 and the output member 24 are axially aligned with the piston on the axis A.

The inner end face 28 of the input rod 22 engages one side 29 of a reaction member, which is preferably an elastomeric reaction disc 30, mounted inside the piston 20. The inner end face 32 of the output rod 24 engages a Belleville spring 34. The Belleville spring 34 is mounted on a disc 36, preferably of metallic material. The disc 36 engages the other side 31 of the reaction disc 30, on the opposite side to the inner face 28 of the input rod 22. An annular washer 38 is positioned around the outer circumferential edge 40 of the disc 36. The washer 38 is engageable with the reaction disc 30. The washer 38 is preferably substantially L-shaped in cross-section and also extends around the outer circumferential edge 35 of the Belleville spring 34. The Belleville spring 34, disc 36, reaction disc 30, and washer 38, are coaxial on the axis A. The end face 32 of the output member 24 has a diameter which is at least equal to the outer diameter of the disc 36 and washer 38 combined.

Figure 3:
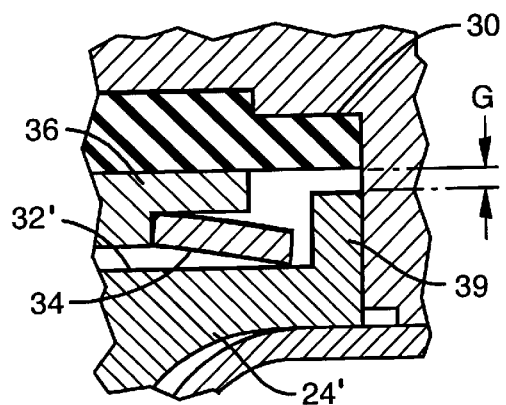
FIG. 3 is a graph of input force against output force for the brake booster of FIG. 1.
Figure 3:
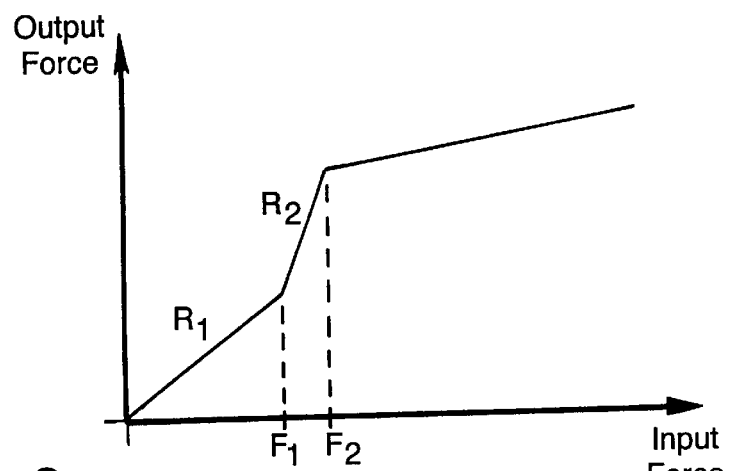

In the rest position of the brake booster 10, the Belleville spring 34 acts on the end face 32 of the output rod 24, to bias the end face away from the washer 38 and the reaction disc 30, to define a predetermined gap or separation G between the washer and the end face (when the washer is in engagement with the reaction disc). The end face 28 of the input rod 22 has a diameter $A_1$. The disc 36 has a diameter $A_2$. The disc 36 and the washer 38 have a combined diameter of $A_3$. During initial braking (FIG. 3), the ratio $R_1$ of input force (the force on the input member 22) to output force (the force produced at the output member 24) of the booster 10 is defined as $$R_1 = \frac{(A_2)^2}{(A_1)^2}$$

because only the disc 36 is acting on the output member 24. As the input force increases, the gap G begins to close until, at a predetermined input force $F_1$ (which is substantially the same as the load produced by the Belleville spring 34), the Belleville spring collapses and the gap G becomes zero. As the input force continues to rise from $F_1$, the ratio $R_2$ of the booster 10 is defined as $$R_2 = \frac{(A_3)^2}{(A_1)^2}$$

because both the disc 36 and the washer 38 are acting on the output member 24. At a second predetermined input force $F_2$, the booster reaches its run-out point and further increases in input force produce little or no further increases in output force.

In an alternative arrangement to the above described embodiment, as shown in FIG. 2a, the annular washer may be replaced by an annular member 39 integrally formed on the end gace 32' of the output member 24'. The annular member 39 extends in the axial direction towards the reaction disc 30, is positioned radially outwards of the disc 36 and the Belleville spring 34, and in the rest position of the booster 10 is spaced from the reaction disc by the predetermined separation G.

The one side 29 of the reaction member 30 preferably includes a shoulder 33 which extends in the axial direction. The shoulder 33 preferably extends circumferentially, about axis A, with a diameter substantially equal to $A_2$.

The present invention provides a brake booster 10 in which the ratio of the booster changes at a predetermined input force $F_1$. This design provides increased brake pressure, for example, during panic braking. Such an effect is achieved in a simple and cheap manner without the need for additional parts (such as a hydraulic pump), and without increasing the size of the booster. The point of change in ratio is determined by spring load of the Belleville spring 34 and, therefore, can be easily set dependent on the load of the spring.

What is claimed is:

1. A brake booster comprising a housing; a diaphragm sealingly mounted inside the housing to define separate chambers inside the housing; a piston having a longitudinal axis, the piston being secured to the diaphragm, extending out of the housing, and being movable along the axis relative to the housing; a reaction member mounted in the piston; an input member extending into the piston and engageable with one side of the reaction member; a disc engageable with the other side of the reaction member; a Belleville spring mounted on the disc; an annular member positioned radially outwards of the disc and engageable with the other side of the reaction member; an output member engaging the Belleville spring, the Belleville spring biasing the output member away from the reaction disc in the rest position of the booster such that only the disc acts on the output member below a predetermined input force on the input member, and such that at or above the predetermined input force the bias of the Belleville spring is overcome and both the disc and the annular member act on the output member.

2. A brake booster as claimed in claim 1, wherein the reaction member is an elastomeric disc.

3. A brake booster as claimed in claim 2, wherein the annular member is a washer positioned around the outer circumferential edge of the disc.

4. A brake booster as claimed in claim 3, wherein the washer has a substantially L-shaped cross-section and extends around the outer circumferential edge of the Belleville spring.

5. A brake booster as claimed in claim 4, wherein the reaction member has a shoulder on said one side which extends circumferentially about the longitudinal axis.

6. A brake booster as claimed in claim 3, wherein the reaction member has a shoulder on said one side which extends circumferentially about the longitudinal axis.

7. A brake booster as claimed in claim 2, wherein the annular member is integrally formed with the output member and positioned around the outer circumferential edge of the disc and the outer circumferential edge of the Belleville spring.

8. A brake booster as claimed in claim 7, wherein the reaction member has a shoulder on said one side which extends circumferentially about the longitudinal axis.

9. A brake booster as claimed in claim 2, wherein the reaction member has a shoulder on said one side which extends circumferentially about the longitudinal axis.

10. A brake booster as claimed in claim 1, wherein the annular member is a washer positioned around the outer circumferential edge of the disc.

11. A brake booster as claimed in claim 10, wherein the washer has a substantially L-shaped cross-section and extends around the outer circumferential edge of the Belleville spring.

12. A brake booster as claimed in claim 11, wherein the reaction member has a shoulder on said one side which extends circumferentially about the longitudinal axis.

13. A brake booster as claimed in claim 10, wherein the reaction member has a shoulder on said one side which extends circumferentially about the longitudinal axis.

14. A brake booster as claimed in claim 1, wherein the annular member is integrally formed with the output member and positioned around the outer circumferential edge of the disc and the outer circumferential edge of the Belleville spring.

15. A brake booster as claimed in claim 14, wherein the reaction member has a shoulder on said one side which extends circumferentially about the longitudinal axis.

16. A brake booster as claimed in claim 1, wherein the reaction member has a shoulder on said one side which extends circumferentially about the longitudinal axis.

* * * * *